United States Patent
Munton

(10) Patent No.: US 11,448,091 B2
(45) Date of Patent: Sep. 20, 2022

(54) WASHING TOOL, WASHING SYSTEM AND A METHOD OF WASHING

(71) Applicant: ROLLS-ROYCE plc, London (GB)

(72) Inventor: David Munton, Derby (GB)

(73) Assignee: ROLLS-ROYCE PLC, London (GB)

(*) Notice: Subject to any disclaimer, the term of this patent is extended or adjusted under 35 U.S.C. 154(b) by 264 days.

(21) Appl. No.: 16/863,012

(22) Filed: Apr. 30, 2020

(65) Prior Publication Data
US 2020/0355091 A1 Nov. 12, 2020

(30) Foreign Application Priority Data

May 9, 2019 (GB) ...................................... 1906541

(51) Int. Cl.
*F01D 25/00* (2006.01)
*B08B 3/02* (2006.01)
(Continued)

(52) U.S. Cl.
CPC ............ *F01D 25/002* (2013.01); *B08B 3/003* (2013.01); *B08B 3/02* (2013.01); *B08B 9/00* (2013.01);
(Continued)

(58) Field of Classification Search
CPC .. B08B 3/003; B08B 9/00; B08B 3/02; B08B 2203/0282; F01D 25/002; B64F 5/30
See application file for complete search history.

(56) References Cited

U.S. PATENT DOCUMENTS

| 5,011,540 | A | * | 4/1991 | McDermott | .......... F01D 25/002 |
| | | | | | 134/40 |
| 5,273,395 | A | * | 12/1993 | McDermott | .............. B08B 3/02 |
| | | | | | 415/121.3 |

(Continued)

FOREIGN PATENT DOCUMENTS

| EP | 1882823 A2 | 1/2008 |
| EP | 2 243 562 A1 | 10/2010 |

(Continued)

OTHER PUBLICATIONS

Combined Search and Examination Report of the Intellectual Property Office of the United Kingdom for GB1906541.6 with report date of Oct. 21, 2019 and search date of Oct. 18, 2019.

(Continued)

Primary Examiner — Benjamin L Osterhout
(74) Attorney, Agent, or Firm — Oliff PLC

(57) ABSTRACT

A washing tool for washing the engine core of a gas turbine engine has: a fluid connector, configured to be connected to a supply of engine washing fluid; a nozzle, in fluid communication with the fluid connector and configured to direct the engine washing fluid into the engine core; a fan blade fixture, configured to engage with a fan blade of the gas turbine engine and fix the position of the washing tool relative to the fan blade; and a second fixture, configured to engage with a part of the gas turbine engine that does not rotate about the axis of the gas turbine engine and fix the position of the washing tool relative to said part of the gas turbine engine. A washing system, a waste water collection system, a method of washing an engine core of a gas turbine engine, and a gas turbine engine, are also described.

20 Claims, 5 Drawing Sheets

(51) Int. Cl.
*B08B 3/00* (2006.01)
*B64F 5/30* (2017.01)
*B08B 9/00* (2006.01)

(52) U.S. Cl.
CPC ......... *B08B 2203/0282* (2013.01); *B64F 5/30* (2017.01)

(56) References Cited

U.S. PATENT DOCUMENTS

| | | | | |
|---|---|---|---|---|
| 5,944,483 | A * | 8/1999 | Beck | ..................... F01D 25/002 |
| | | | | 415/117 |
| 8,152,934 | B2 | 4/2012 | Lee et al. | |
| 8,444,773 | B2 | 5/2013 | Tadayon | |
| 10,364,699 | B2 | 7/2019 | Saenz | |
| 10,428,664 | B2 * | 10/2019 | Nasr | ......................... F02C 3/04 |
| 10,731,508 | B2 * | 8/2020 | Tibbetts | ............... C11D 3/2086 |
| 2005/0199270 | A1 * | 9/2005 | Watt | .......................... B08B 9/00 |
| | | | | 134/166 R |
| 2008/0087301 | A1 | 4/2008 | Lee et al. | |
| 2010/0095984 | A1 | 4/2010 | Tadayon | |
| 2010/0200023 | A1 * | 8/2010 | Giljohann | ............. F01D 25/002 |
| | | | | 134/198 |
| 2014/0260308 | A1 | 9/2014 | Dorshimer et al. | |
| 2015/0122292 | A1 * | 5/2015 | McDermott | .............. B08B 9/00 |
| | | | | 134/169 R |
| 2016/0090859 | A1 * | 3/2016 | Aggas | ..................... F02C 7/047 |
| | | | | 60/785 |
| 2016/0186602 | A1 | 6/2016 | Saenz | |
| 2016/0230592 | A1 | 8/2016 | Saenz | |
| 2017/0114663 | A1 | 4/2017 | Appel et al. | |
| 2017/0204739 | A1 * | 7/2017 | Rawson | .................... B08B 5/02 |
| 2018/0258787 | A1 * | 9/2018 | Tibbetts | .................... B64F 5/30 |
| 2018/0298781 | A1 * | 10/2018 | Tibbetts | .................. B08B 3/003 |
| 2019/0107005 | A1 * | 4/2019 | Kulkarni | ........... B01F 25/31331 |

FOREIGN PATENT DOCUMENTS

| | | |
|---|---|---|
| WO | 2012/130443 A2 | 10/2012 |
| WO | 2015/051146 A1 | 4/2015 |

OTHER PUBLICATIONS

Sep. 22, 2020 extended Search Report issued in European Patent Application No. 20170313.9.

* cited by examiner

WASHING TOOL, WASHING SYSTEM AND A METHOD OF WASHING

CROSS-REFERENCE TO RELATED APPLICATIONS

This specification is based upon and claims the benefit of priority from United Kingdom patent application number GB 1906541.6 filed on May 9, 2019, the entire contents of which is incorporated herein by reference.

BACKGROUND

Field of the Disclosure

The present disclosure relates to a washing tool for washing the engine core of a gas turbine engine, a washing system for washing the engine core of a gas turbine engine, a waste water collection system for collecting engine washing fluid that has been used to clean a gas turbine engine and a method of washing the engine core of a gas turbine engine.

Description of the Related Art

Gas turbine engines, especially those powering aircraft ingest debris such as sand, dust, soot and carbon during use. The accumulation of this debris can detrimentally affect engine performance and efficiency and may cause wear, thus necessitating periodic cleaning and maintenance. Cleaning a gas turbine engine, especially the air passages within the engine core of the gas turbine engine, can be a difficult operation. For gas turbine engines powering aircraft, the cleaning can require temporarily removing the engine from the wing of the aircraft. This is a time consuming and costly operation, requiring specialised equipment and specialist technicians and can present certain health and safety risks. During the operation, which typically involves cleaning two or four engines, the engines and the aircraft are not available for use, which is very costly for the airline that owns or leases the aircraft.

It may therefore be desirable to make it possible to clean a gas turbine engine without the requirement to remove it from an aircraft or otherwise dismantle the gas turbine engine or surrounding equipment to any significant extent.

SUMMARY OF THE DISCLOSURE

According to a first aspect there is provided a washing tool for washing an engine core of a gas turbine engine, the washing tool comprising a fluid connector, configured to be connected to a supply of engine washing fluid; at least one nozzle, in fluid communication with the fluid connector and configured to direct the engine washing fluid into the engine core of the gas turbine engine; a fan blade fixture, configured to engage with a fan blade of the gas turbine engine and fix the position of the washing tool relative to the fan blade; and a second fixture, configured to engage with a part of the gas turbine engine that does not rotate about the axis of the gas turbine engine and fix the position of the washing tool relative to said part of the gas turbine engine.

In an arrangement, the at least one nozzle is configured to be moveable between a retracted position and a deployed position while the fan blade fixture of the washing tool is engaged with the fan blade.

In an arrangement, the washing tool is configured such that, in moving from the retracted position to the deployed position, each of the at least one nozzles is inserted between a pair adjacent inlet guide vanes of the engine core.

In an arrangement, the washing tool is configured such that moving the at least one nozzle from the retracted position to the deployed position engages the second fixture with said part of the gas turbine engine.

In an arrangement, the washing tool comprises a deployment lock that can be switched between an unlocked position, in which the at least one nozzle can move between deployed and retracted positions and the second fixture can change between engaged and unengaged states, and a locked position in which the position of the at least one nozzle and the state of the second fixture is fixed.

In an arrangement, the second fixture is configured to engage with at least one of the inlet guide vanes of the engine core.

In an arrangement, the second fixture comprises an inlet guide vane engagement member associated with each nozzle of the at least one nozzle of the washing tool that includes a section configured to engage with the leading edge of an inlet guide vane.

In an arrangement, the fan blade fixture comprises at least one of a first engaging hook configured to engage with the leading edge of a fan blade when the fan blade fixture engages with the fan blade and a second engaging hook configured to engage with the trailing edge of a fan blade when the fan blade fixture engages with the fan blade.

In an arrangement, the washing tool comprises a fan blade lock that can be switched between an unlocked position, in which the fan blade fixture can move relative to a fan blade, and a locked position, in which the fan blade fixture engages with a fan blade and has a fixed position relative to the fan blade.

In an arrangement, at least one of the fan blade fixture and the second fixture includes a section of resilient material that contacts the component of the gas turbine engine with which it engages.

In an arrangement, the fan blade fixture may comprise a convex section of the resilient material, shaped to correspond to, and engage with, the concave surface of the fan blade.

In an arrangement, each inlet guide vane engagement member may comprise a convex section of the resilient material, shaped to correspond to, and engage with, the concave surface of the inlet guide vane.

According to a second aspect, there is provided a washing system for washing an engine core of a gas turbine engine, the washing system comprising a washing tool as discussed above; a washing rig, configured to provide a supply of engine washing fluid; and a hose connecting the washing tool to the supply of engine washing fluid of the washing rig.

In an arrangement, the system is mounted to a vehicle and/or a trailer to be towed by a vehicle.

In an arrangement, the washing system further comprises a waste water collection system, configured to collect engine washing fluid that has passed through a gas turbine engine.

In an arrangement, the waste water collection system comprises a sheet of flexible fluid impermeable material configured to be spread out below the gas turbine engine; at least one support for the sheet of flexible fluid impermeable material; and a waste water collection tank; wherein the sheet of flexible fluid impermeable material comprises a fluid outlet connected to the waste water collection tank; and the at least one support is configured to support the sheet of flexible fluid impermeable material such that fluid falling on the sheet of flexible fluid impermeable material drains to the fluid outlet and into the waste water collection tank.

In an arrangement, at least one of the supports can be moved between an extended position, in which it supports the sheet of flexible fluid impermeable material, and a stowed position, for storage and/or transport of the system.

In an arrangement, at least one of the supports is adjustable when in the extended position.

In an arrangement, the washing system further comprising a waste water treatment unit, configured to process collected waste water to regenerate engine washing fluid that can be used to wash a gas turbine engine.

According to a third aspect, there is provided a waste water collection system for collecting engine washing fluid that has been used to clean a gas turbine engine, the waste water collection system comprising a sheet of flexible fluid impermeable material configured to be spread out below the gas turbine engine; at least one support for the sheet of flexible fluid impermeable material; and a waste water collection tank; wherein the sheet of flexible fluid impermeable material comprises a fluid outlet connected to the waste water collection tank; and the at least one support is configured to support the sheet of flexible fluid impermeable material such that fluid falling on the sheet of flexible fluid impermeable material drains to the fluid outlet and into the waste water collection tank.

In an arrangement, at least one of the supports can be moved between an extended position, in which it supports the sheet of flexible fluid impermeable material, and a stowed position, for storage and/or transport of the system.

In an arrangement, at least one of the supports is adjustable when in the extended position.

In an arrangement, the waste water collection system further comprises a waste water treatment unit, configured to process collected waste water to regenerate engine washing fluid that can be used to wash a gas turbine engine.

In an arrangement, the system is mounted to a vehicle and/or to a trailer to be towed by a vehicle.

According to a fourth aspect, there is provided a method of washing an engine core of a gas turbine engine, comprising providing a washing tool as discussed above to the gas turbine engine; engaging the fan blade fixture to a fan blade of the gas turbine engine; engaging the second fixture to a part of the gas turbine engine that does not rotate about the axis of the gas turbine engine; and providing a supply of engine washing fluid to the washing tool.

According to a fifth aspect, there is provided a gas turbine engine that has an engine core that has been washed using the method of the fourth aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
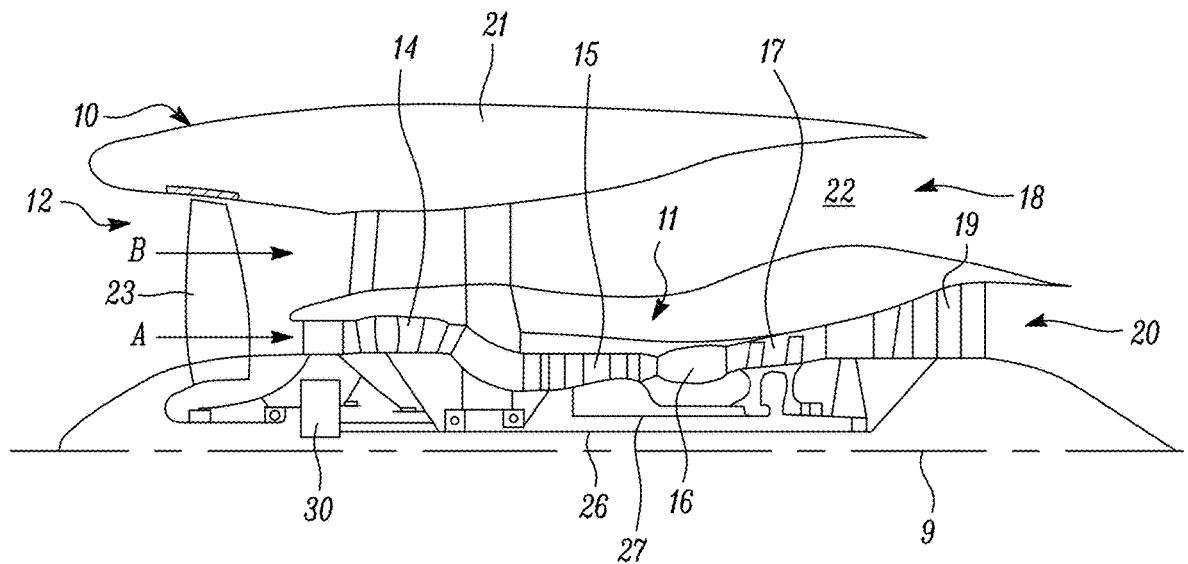
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
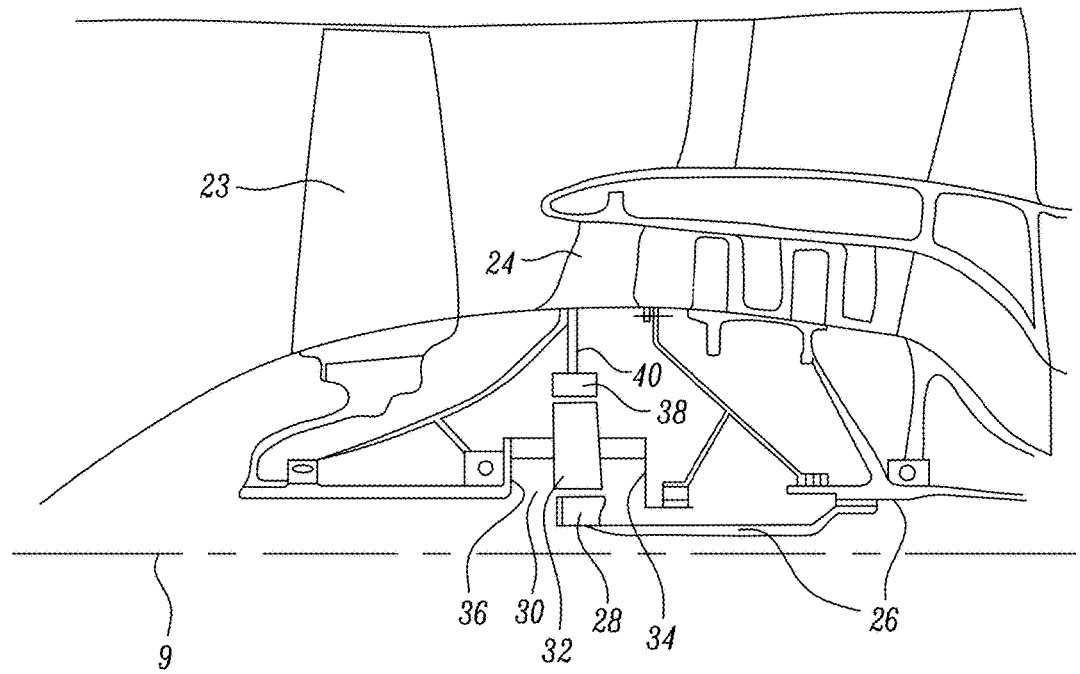
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
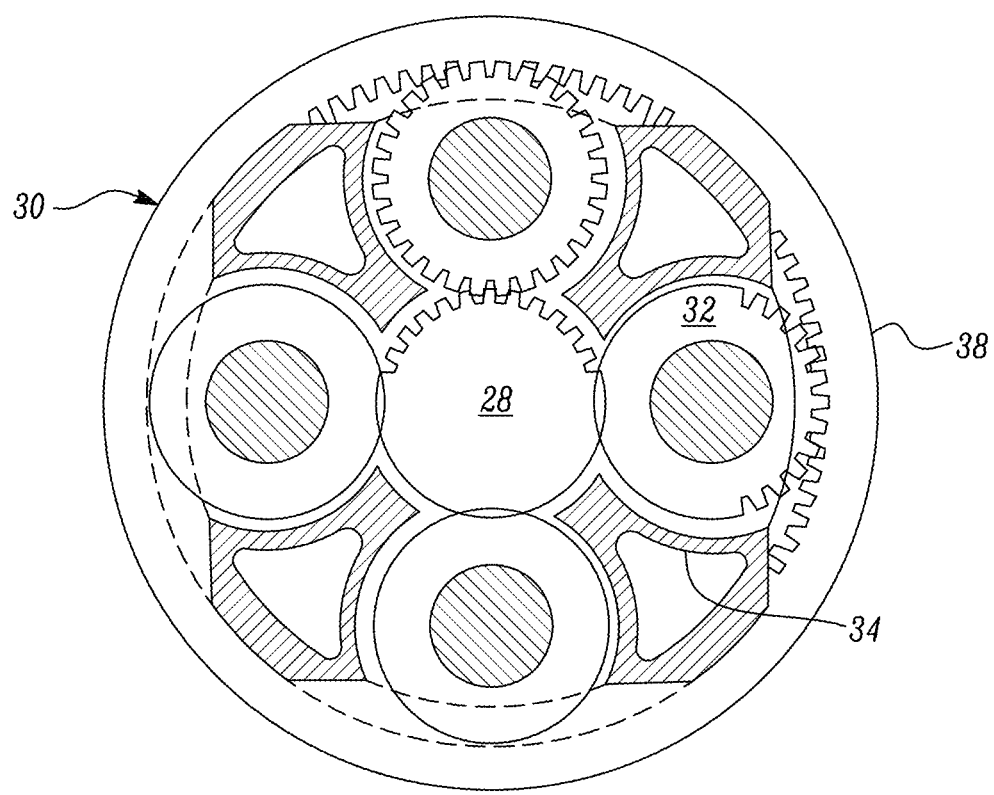
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate.

In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
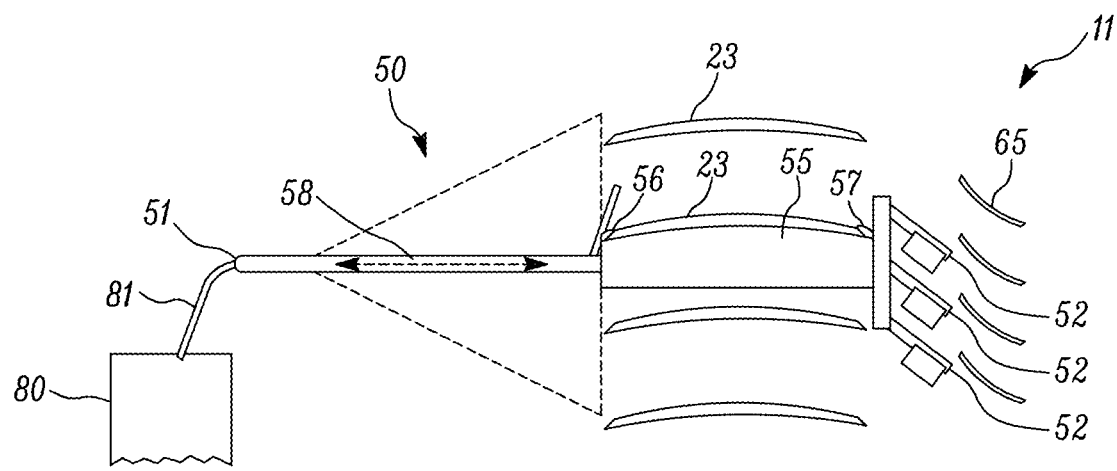
FIG. 4 schematically depicts a washing tool in the process of engagement with a gas turbine engine.
Figure 5:
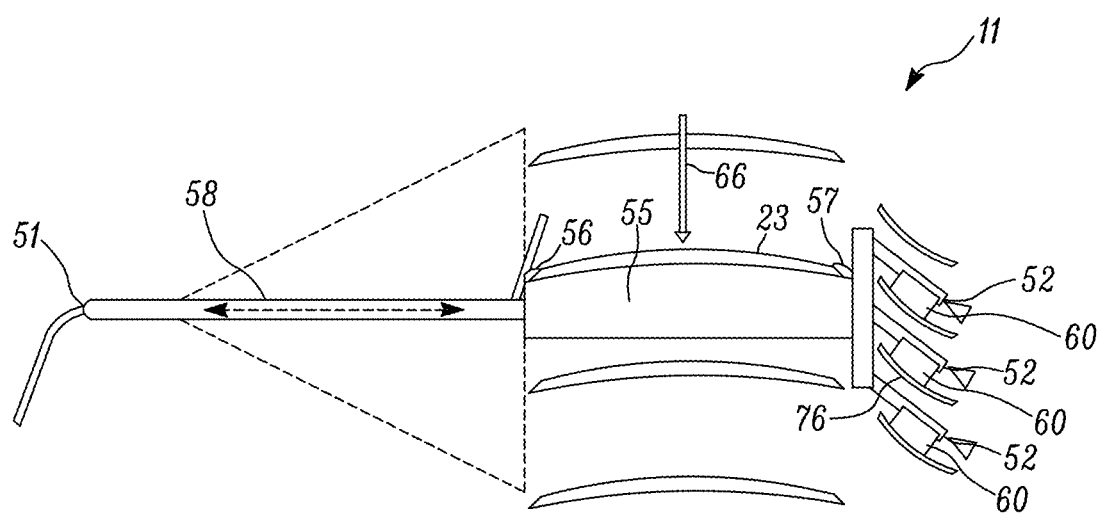
FIG. 5 schematically depicts the washing tool of FIG. 5 in a deployed position.

FIGS. 4 and 5 show a washing tool 50 that may be used for washing the engine core of a gas turbine engine, such as those described above. As shown, it includes a fluid connector 51 that can be connected to a supply of engine washing fluid. The washing tool 50 further comprises at least one nozzle 52, in fluid communication with the fluid connector 51 such that engine washing fluid provided to the fluid connector can be passed to the at least one nozzle 52. The at least one nozzle 52 is configured such that when the washing tool 50 is provided to a gas turbine engine, the at least one nozzle 52 directs engine washing fluid emitted from the nozzle 52 into the engine core 11 of the gas turbine engine.

The washing tool 50 further includes a fan blade fixture 55 that engages with a fan blade 23 of the gas turbine engine. The fan blade fixture 55 is configured such that, when it is engaged with the fan blade, it fixes the position of the washing tool 50 relative to the fan blade 23. In some arrangements, the fan blade fixture 55 may engage with two or more fan blades 23 and fix the position of the washing tool relative to the two or more fan blades 23.

The washing tool 50 further includes a second fixture 60 that engages with a part of the gas turbine engine that does not rotate about the principle axis of the gas turbine engine. For example, the part may be a component that is stationary relative to the rotation of the fan blades of the gas turbine engine. The second fixture 60 is configured such that, when it is engaged with the non-rotating part of the gas turbine engine, it fixes the position of the washing tool 50 relative to that part of the gas turbine engine.

In an arrangement of a washing tool 50, such as that described above, the washing tool 50 may maintain a fixed position relative to both a fan blade, or plural fan blades, of the gas turbine engine and a part of the gas turbine engine that does not rotate about the axis of the gas turbine engine. In so doing, the washing tool 50 may fix the position of the fan blades of the gas turbine engine, reducing the risk of accident or injury to an operator engaged with the process of washing the engine core of the gas turbine engine.

Furthermore, by combining into one component a tool used to provide the engine washing fluid and a tool used to secure the position of the fan blades 23 of the gas turbine engine, the apparatus and process may be simplified. Furthermore, in contrast to an arrangement in which two separate tools are used for these purposes, the risk is greatly reduced that, after completion of washing of the engine core 11, a tool is left in place that locks the fan blades 23 into position.

As shown in FIGS. 4 and 5, the at least one nozzle 52 may be mounted to a part of the washing tool 50 that enables the one or more nozzles 52 to be moved between a retracted position (shown in FIG. 4) and a deployed position (shown in FIG. 5). In an arrangement, as shown in FIGS. 4 and 5, the one or more nozzles 52 may be mounted to a fluid conduit 58 that conveys the engine washing fluid from the fluid connector 51 of the washing tool 50 to the one or more nozzles 52.

The fluid conduit 58 may be configured to move relative to the fan blade fixture 55 while the fan blade fixture 55 is engaged with a fan blade 23, enabling the one or more nozzles 52 to be moved between the retracted position and the deployed position. For example, the fluid conduit 58 may pass through the fan blade fixture 55 and be configured to be able to slide through the fan blade fixture 55 in order to change the position of the fluid conduit 58, and therefore the one or more nozzles 52, relative to the fan blade 55.

As shown in FIG. 4, when the washing tool is configured such that the one or more nozzles 52 are in the retracted position, the washing tool 50 may be inserted through a space between two adjacent fan blades 23. The fan blade fixture 55 may then be engaged with one of the fan blades 23 in order to secure its position relative to the fan blade. In this retracted position, the one or more nozzles 52 may be located in a space between the fan blades 23 of the gas turbine engine and the inlet to the engine core 11.

After the fan blade fixture 55 has been engaged with a fan blade 23 of the gas turbine engine, the one or more nozzles 52 may be moved to the deployed position, as shown in FIG. 5. In the deployed position, each of the one or more nozzles 52 may be inserted between a pair of adjacent inlet guide vanes 65. This may enable the washing tool 50 to provide engine washing fluid directly into the engine core 11. It should be appreciated that, in the deployed position, the one or more nozzles 52 may remain located between the inlet guide vanes 65 or may reach a position further into the engine core than the inlet guide vanes 65.

In some arrangements, the one or more nozzles 52 may not be inserted into the space between inlet guide vanes 65 and may remain outside the engine core 11 but be positioned to direct engine washing fluid into the engine core. Similarly, although the arrangement depicted in FIGS. 4 and 5 is configured such that the one or more nozzles 52 can be moved from a retracted position to a deployed position after the fan blade fixture 55 has been engaged with a fan blade 23, this is not essential and the one or more nozzles 52 may be configured not to move relative to the fan blade fixture 55 after it has engaged with a fan blade 23.

In an arrangement, in which the one or more nozzles 52 are configured to move between a retracted portion and a deployed position, the washing tool 50 may be configured such that, in moving the one or more nozzles 52 to the deployed position, the second fixture 60 engages with the part of the gas turbine engine that does not rotate about the axis of the gas turbine engine. In the arrangement depicted in FIG. 5 and shown in more detail in FIG. 6, the second fixture 60 is configured to engage with the inlet guide vane 65 of the engine core 11. Such an arrangement may securely fix the washing tool 50 relative to the gas turbine engine, in turn securely fixing the position of the fan blades 23 and alternatively or additionally may provide a secure position of the one or more nozzles 52 relative to the engine core 11 which may enable accurate provision of the engine washing fluid into the engine core 11.

Figure 6:
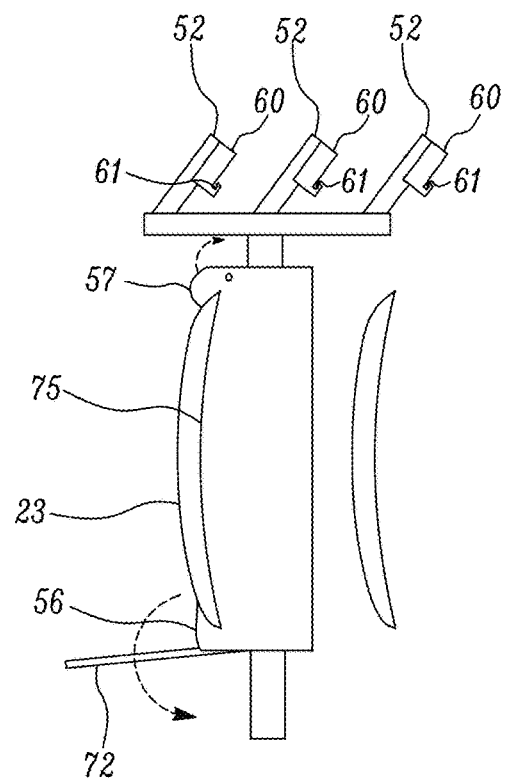
FIG. 6 schematically depicts further detail of the washing tool shown in FIGS. 4 and 5.

As shown in FIG. 6, which is a more detailed view of the washing tool 50, the second fixture 60 may include an engagement member 61 associated with each nozzle 52 that each has a section that engages with the leading edge of an inlet guide vane 65. Such an arrangement may provide a simple mechanism to engage with the inlet guide vanes 65, namely a part of the gas turbine engine that does not rotate about the axis of the gas turbine engine. In particular, the second fixture 60 may not be required to be clamped to the inlet guide vanes 65 because the inclination of the rotation of the fan blade 23 in a first direction 66, exerting a force in the first direction 66 on the washing tool 50, may press the second fixture 60 of the washing tool against the inlet guide vanes 65, which provide a reaction force in an opposite direction. It should be appreciated, however, that in alternative arrangements, the second fixture 60 may be configured to engage with one or more other parts of the gas turbine engine in order to fix the position of the washing tool and/or may include a clamping mechanism.

The washing tool 50 may include a deployment lock 71 used to secure the one or more nozzles 52 in the deployed position when the deployment lock 71 is in a locked position. When the deployment lock 71 is in an unlocked position, the one or more nozzles 52 may be moved between the deployed and retracted positions. In arrangements in which movement of the one or more nozzles 52 to the deployed position also sets the second fixture 60 to its engaged state, in which it engages with the part of a gas turbine engine that does not rotate about the axis of the gas turbine engine, the locked position of the deployment lock may also fix the second fixture 60 in its engaged state.

In the arrangement of a washing tool shown in FIGS. 4 to 6, the deployment lock 71 may be configured to fix the position of the fluid conduit 58 relative to the position of the fan blade fixture 55 such that, in the locked position, it prevents the fluid conduit 58 from moving between the retracted position and the deployed position.

The fan blade fixture 55 may be configured to be clamped to a fan blade 23. For example, as shown in FIG. 6, the fan blade fixture 55 may include a first engaging hook 56 configured to engage with the leading edge of a fan blade 23 and a second engaging hook 57 configured to engage with the trailing edge of the fan blade 23. In order to engage the fan blade fixture 55 with the fan blade 23 one or both of the engaging hooks 56, 57 may be moved from an open position to a closed position to secure the fan blade fixture 55 to the fan blade 23. It should be appreciated that in some arrangements, either one of the engaging hooks 56, 57 may be omitted and that entirely different mechanisms may be provided for fixing the fan blade fixture 55 to the fan blade 23.

In an arrangement, the washing tool 50 may have a fan blade lock 72 for securing the fan blade fixture 55. In particular, when the fan blade lock 72 is in an unlocked position, the fan blade fixture 55 may be moved relative to a fan blade but, when the fan blade lock 72 is in the locked position, the fan blade fixture 55 may be secured in an engaged position, fixing the position of the fan blade fixture relative to the fan blade 23.

Figure 7:
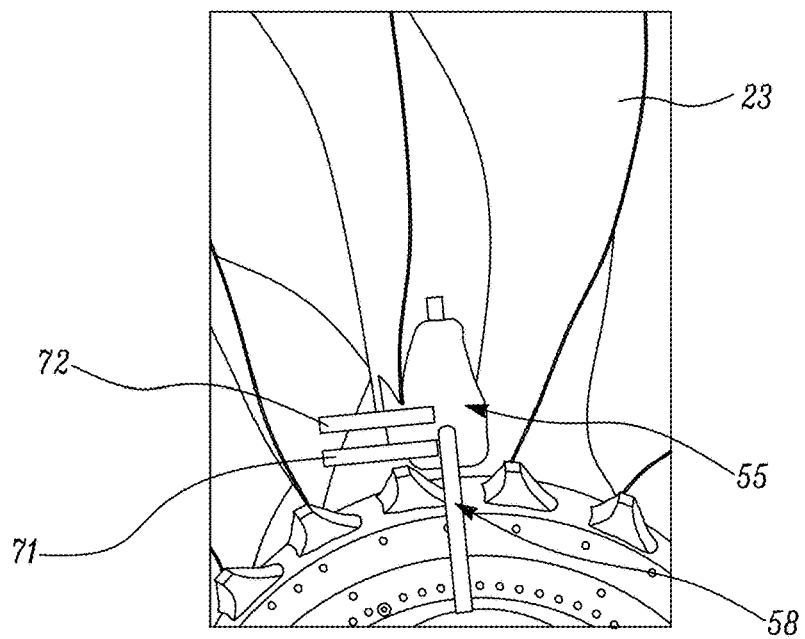
FIG. 7 schematically depicts the washing tool of FIGS. 4 to 6 engaged with a fan blade of a gas turbine engine.

In an arrangement, as shown in FIG. 7, the deployment lock 71 and the fan blade lock 72 may have actuating handles that are provided on the washing tool 50 such that an operator of the washing tool 50 can reach them when the washing tool 50 is in the required position to wash the engine core of the gas turbine engine. Accordingly, in use, an operator may insert the washing tool into the gas turbine engine, operate the fan blade lock 72 in order to fix the washing tool relative to one of the fan blade 23 of the gas turbine engine, move the one or move nozzles 52 into the deployed position, as required, and then engage the deployment lock 71 in order to fix the position of the one or more nozzles 52 relative to the engine core 11 and fix the position of the washing tool 50 relative to a part of the gas turbine engine that does not rotate about the axis of the gas turbine engine, such as the inlet guide vanes and then activate the deployment lock. This may both secure the one or more nozzles 52 in the position required for the washing process and also secure the position of the fan blades 23.

It should be appreciated that, in arrangements in which the one or more nozzles 52 do not move relative to the fan blade fixture 55, namely move to a deployment position, the deployment lock 71 may only secure the second fixture in an engaged state that secures the position of the washing tool 50 relative to the part of the gas turbine engine that does not rotate about the axis of the gas turbine engine.

In an arrangement, the handles of the deployment lock 71 and the fan blade lock 72 may be configured such that when each is in its respective locked and unlocked positions the operator of the washing tool is provided with a visual indicator of the state of the deployment lock 71 and the fan blade lock 72.

In some arrangements, at least one of the fan blade fixture 55 and the second fixture 60 includes a section of resilient material that contacts the component of the gas turbine engine with which the fixture 55, 60 engages. The resilient material may be selected to be sufficiently resilient that it minimises the likelihood of damage to the gas turbine engine when the fixture 55, 60 is engaged with a component of the gas turbine engine but is sufficiently stiff that, when it is engaged, the fixture 55, 60 substantially fixes the position of the washing tool 50 relative to the component of the gas turbine engine with which it engages. A high density foam may be used.

In an arrangement, as shown in FIGS. 4 to 6, the fan blade fixture 55 may include a convex section 75 of the resilient material. The profile of the convex section 75 may be shaped to correspond to the shape of the concave surface of the fan blade 23. The fan bade fixture 55 may be configured such that, when the fan blade fixture 55 is engaged with the fan blade 23, the convex section 75 of resilient material engages with the concave surface of the fan blade 23.

In an arrangement, as shown in FIGS. 4 to 6, each inlet guide vane engagement member of the second fixture 60 may include a convex section 76 of resilient material that is configured to engage with the concave surface of an inlet guide vane 65. The convex section 76 of the resilient material may have a shape that corresponds to the concave surface of the inlet guide vane 65. The second fixture 60 may be configured such that, when it engages with the inlet guide vanes, the convex section 76 of resilient material of each of the at least one inlet guide vane engagement members engages with the concave surface of a corresponding inlet guide vane 65.

In use, the washing tool 50 depicted in FIGS. 4 to 7 may be used as part of a washing system that may enable washing of the engine core 11 of a gas turbine engine while the engine remains attached to an aircraft. In addition to the washing tool 50, such a washing system may include a washing rig 80 that is configured to provide a supply of engine washing fluid and a hose 81 that connects the supply to engine washing fluid within the washing rig 80 to the fluid connector 51 of the washing tool 50 in order to provide the supply of engine washing fluid to the washing tool 50. It should be appreciated that the system may use any suitable engine washing fluid. In an arrangement, the one or more nozzles 52 may be configured such that the engine washing fluid generates a washing foam when it exits the nozzles 52.

It should be appreciated that, although the washing tool 50 is configured to be inserted into a gas turbine engine to wash the engine core 11 of the gas turbine engine while securing the position of the fan blade 23, before the washing tool 50 is inserted into the gas turbine engine it may also be used to wash the fan blade 23.

In an arrangement, the washing system may be configured to be mounted on a vehicle and/or a trailer to be towed by a vehicle in order to facilitate movement of the washing system to an aircraft, for example, for commencement of an engine washing process.

It should be appreciated that, in addition to the elements of the washing system discussed above, the washing rig 80 may include components to generate the engine washing fluid, such as a water tank, a detergent tank and a mixer for mixing detergent and water in order to generate the engine washing fluid. The washing rig 80 may further include an air pump and/or a water pump used to deliver the engine washing fluid to the washing tool 50 and drive it through the one or more nozzles 52. Furthermore, the washing rig 80 may include a generator to provide power for the washing rig 80 such that it can operate independently. Any or all of these components may be mounted on the vehicle and/or trailer of the washing system.

Figure 8:
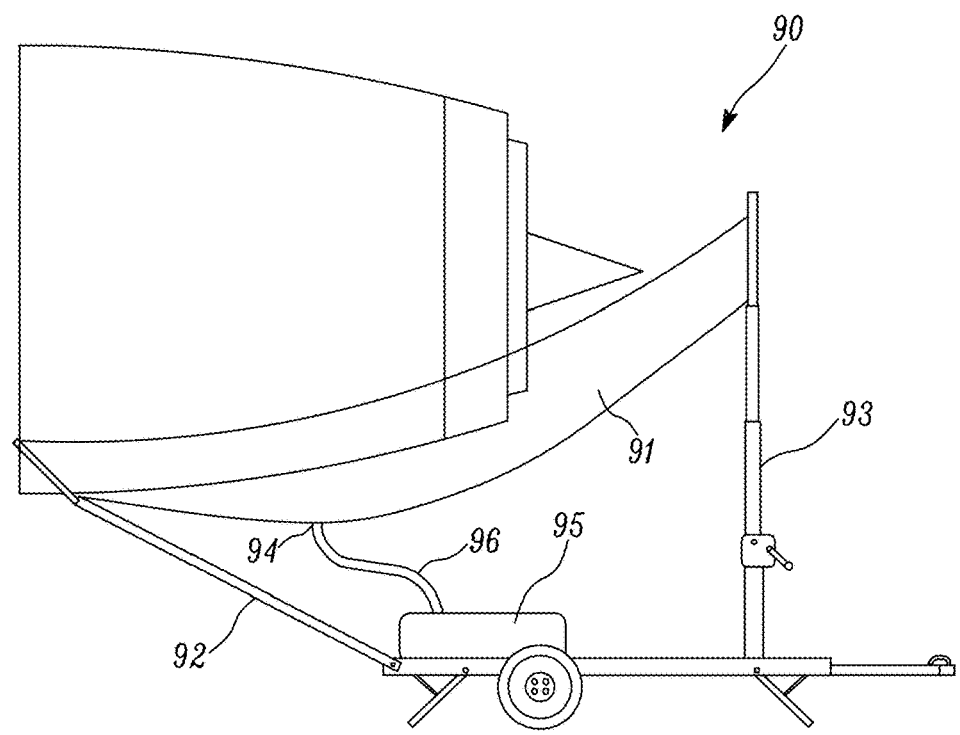
FIG. 8 schematically depicts a waste water collection system that may be employed as part of a washing system that may include the washing tool shown in FIGS. 4 to 7.
Figure 9:
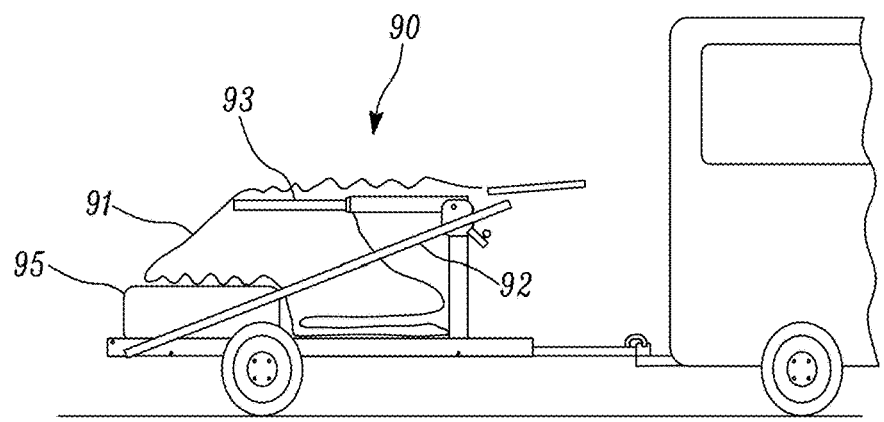
FIG. 9 schematically depicts the waste water collection system of FIG. 8 in a stowed position.

In an arrangement, a waste water collection system 90 may be provided, configured to collect engine washing fluid that has been used to clean a gas turbine engine. The waste water collection system 90 may be part of, or separate from, the washing system. FIGS. 8 and 9 depict an example of a waste water collection system.

The waste water collection system includes a sheet of flexible fluid impermeable material 91 that is configured to be spread out below the gas turbine engine in order to collect the engine washing fluid that has passed through the gas turbine engine during a cleaning process. At least one support 92, 93 is provided in order to support the flexible fluid impermeable material 91 in a position spread out below a gas turbine engine.

The sheet of flexible fluid impermeable material includes one or more fluid outlets that enable fluid collected by the sheet of flexible fluid impermeable material 91 to be transferred to a waste water collection tank 95. As shown in FIG. 8, in an arrangement, the fluid outlet 94 of the sheet of flexible fluid impermeable material 91 may be connected to the waste water collection tank 95 by a hose 96. It should be appreciated that alternative arrangements are possible. For example, the fluid outlet 94 of the sheet of flexible fluid impermeable material 91 may be connected directly to the waste water collection tank 95.

In an arrangement, at least one of the supports 92, 93 may be moved between an extended position, as shown in FIG. 8, in which the supports 92, 93 support the sheet of flexible fluid impermeable material 91 in a position required to collect engine washing fluid that has passed through a gas turbine engine in a cleaning process, and a stowed position, as shown in FIG. 9, in which the waste water collection system is suitable for storage and/or transportation, for example reduced in size. For example, as shown in the arrangement depicted in FIGS. 8 and 9, one or more supports 92 may be configured to move between a position in which they extend away from the remainder of the waste water collection system 90 to a position in which they fold inward to provide a stowed position. Alternatively or additionally, one or more supports 93 may be telescopic such that, in a first position, it extends further away from the remainder of the waste water collection system 90 and, in a second, stowed, position, the telescopic support 93 extends a shorter distance from the remainder of the waste water collection system 90. When the supports 92, 93 are moved to their respective stowed positions, the sheet of flexible fluid impermeable material 91 may be folded up to make it also suitable for storage and/or transport.

In an arrangement, at least one of the supports 92, 93 may be configured such that, when it is in an extended position, it can be adjusted. A waste water collection system 90 including such adjustable supports 92, 93 may be configured to be used with any of a variety of different gas turbine engines.

Use of a waste water collection system 90 such as that described above may beneficially reduce the amount of engine washing fluid that may be lost during an engine cleaning process. This may be beneficial because there may be restrictions on the extent of any spillage of engine washing fluid for certain engine washing fluid and/or for use in certain locations. Furthermore, depending on the engine washing fluid used, it may be possible to re-use at least some of the engine washing fluid that is collected by the waste water collection system 90.

In an arrangement, the waste water collection system 90 may include a water treatment unit that is configured to process collected waste water to enable regeneration of engine washing fluid that can be used in a subsequent washing process for a gas turbine engine.

As shown in FIGS. 8 and 9, the waste water collection system 90 may be mounted to a vehicle and/or a trailer to be towed by a vehicle. The waste water collection system 90 may be mounted to the same vehicle and/or trailer as a washing system or may be mounted to a separate vehicle and/or trailer.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A washing tool for washing an engine core of a gas turbine engine, the washing tool comprising:
   a fluid connector, configured to be connected to a supply of engine washing fluid;
   at least one nozzle, in fluid communication with the fluid connector and configured to direct the engine washing fluid into the engine core of the gas turbine engine;
   a fan blade fixture, configured to engage with a fan blade of the gas turbine engine and fix the position of the washing tool relative to the fan blade; and
   a second fixture, configured to engage with a part of the gas turbine engine that does not rotate about the axis of the gas turbine engine and fix the position of the washing tool relative to said part of the gas turbine engine,
   wherein the washing tool is configured to fix the position of the fan blade of the gas turbine engine.

2. The washing tool according to claim 1, wherein the at least one nozzle is configured to be moveable between a retracted position and a deployed position while the fan blade fixture of the washing tool is engaged with the fan blade.

3. The washing tool according to claim 2, wherein the washing tool is configured such that, in moving from the retracted position to the deployed position, each of the at least one nozzles is inserted between a pair of adjacent inlet guide vanes of the engine core.

4. The washing tool according to claim 2, wherein the washing tool is configured such that moving the at least one nozzle from the retracted position to the deployed position engages the second fixture with said part of the gas turbine engine.

5. The washing tool according to claim 4, wherein the washing tool comprises a deployment lock that can be switched between an unlocked position, in which the at least one nozzle can move between deployed and retracted positions and the second fixture can change between engaged and unengaged states, and a locked position in which the position of the at least one nozzle and the state of the second fixture is fixed.

6. The washing tool according to claim 3, wherein the second fixture is configured to engage with at least one of the inlet guide vanes of the engine core.

7. The washing tool according to claim 6, wherein the second fixture comprises an inlet guide vane engagement member associated with each nozzle of the at least one nozzle of the washing tool that includes a section configured to engage with the leading edge of an inlet guide vane.

8. The washing tool according to claim 1, wherein the fan blade fixture comprises at least one of a first engaging hook configured to engage with the leading edge of a fan blade when the fan blade fixture engages with the fan blade and a second engaging hook configured to engage with the trailing edge of a fan blade when the fan blade fixture engages with the fan blade.

9. The washing tool according to claim 1, wherein the washing tool comprises a fan blade lock that can be switched between an unlocked position, in which the fan blade fixture can move relative to a fan blade, and a locked position, in which the fan blade fixture engages with a fan blade and has a fixed position relative to the fan blade.

10. The washing tool according to claim 1, wherein at least one of the fan blade fixture and the second fixture includes a section of resilient material that contacts the component of the gas turbine engine with which it engages.

11. The washing tool according to claim 10, wherein the fan blade fixture comprises a convex section of the resilient material, shaped to correspond to, and engage with, the concave surface of the fan blade.

12. The washing tool according to claim 10, wherein the second fixture comprises an inlet guide vane engagement member associated with each nozzle of the at least one nozzle of the washing tool that includes a section configured to engage with the leading edge of an inlet guide vane, and each inlet guide vane engagement member comprises a convex section of the resilient material, shaped to correspond to, and engage with, the concave surface of the inlet guide vane.

13. A washing system for washing an engine core of a gas turbine engine, the washing system comprising:
   a washing tool according to claim 1;
   a washing rig, configured to provide a supply of engine washing fluid; and
   a hose connecting the washing tool to the supply of engine washing fluid of the washing rig.

14. The washing system according to claim 13, wherein the system is mounted to a vehicle and/or a trailer to be towed by a vehicle.

15. The washing system according to claim 13, further comprising a waste water collection system, configured to collect engine washing fluid that has passed through a gas turbine engine.

16. The washing system according to claim 15, wherein the waste water collection system comprises:
   a sheet of flexible fluid impermeable material configured to be spread out below the gas turbine engine;
   at least one support for the sheet of flexible fluid impermeable material; and
   a waste water collection tank;
   wherein the sheet of flexible fluid impermeable material comprises a fluid outlet connected to the waste water collection tank; and
   the at least one support is configured to support the sheet of flexible fluid impermeable material such that fluid falling on the sheet of flexible fluid impermeable material drains to the fluid outlet and into the waste water collection tank.

17. The washing system according to claim 16, wherein the at least one support can be moved between an extended position, in which it supports the sheet of flexible fluid impermeable material, and a stowed position, for storage and/or transport of the system.

18. The washing system according to claim 17, wherein the at least one support is adjustable when in the extended position.

19. The washing system according to claim 16, further comprising a waste water treatment unit, configured to process collected waste water to regenerate engine washing fluid that can be used to wash a gas turbine engine.

20. A method of washing an engine core of a gas turbine engine, comprising:
   providing a washing tool according to claim 1 to the gas turbine engine;
   engaging the fan blade fixture to a fan blade of the gas turbine engine;
   engaging the second fixture to a part of the gas turbine engine that does not rotate about the axis of the gas turbine engine; and
   providing a supply of engine washing fluid to the washing tool.

* * * * *